(12) United States Patent
Tsujimoto et al.

(10) Patent No.: US 7,431,326 B2
(45) Date of Patent: Oct. 7, 2008

(54) AIRBAG APPARATUS

(75) Inventors: Kei Tsujimoto, Hikone (JP); Yoshitaka Matsui, Kanzaki-gun (JP); Wataru Nakazawa, Higashiomi (JP)

(73) Assignee: Takata Corporation, Tokyo (JP)

(*) Notice: Subject to any disclaimer, the term of this patent is extended or adjusted under 35 U.S.C. 154(b) by 440 days.

(21) Appl. No.: 11/186,910

(22) Filed: Jul. 22, 2005

(65) Prior Publication Data
US 2006/0022437 A1 Feb. 2, 2006

(30) Foreign Application Priority Data
Jul. 30, 2004 (JP) ............... 2004-224131
Jul. 30, 2004 (JP) ............... 2004-224132

(51) Int. Cl.
*B60R 21/217* (2006.01)
(52) U.S. Cl. .............. 280/728.2; 280/732; 280/740
(58) Field of Classification Search .............. 280/728.2, 280/732, 740
See application file for complete search history.

(56) References Cited

U.S. PATENT DOCUMENTS

| 4,915,410 | A | * | 4/1990 | Bachelder | ............... | 280/732 |
| 5,433,471 | A | * | 7/1995 | Shepherd et al. | ......... | 280/728.2 |
| 5,490,690 | A | * | 2/1996 | Mihm | ............ | 280/728.2 |
| 5,533,750 | A | * | 7/1996 | Karlow et al. | ............ | 280/730.2 |
| 5,542,692 | A | * | 8/1996 | Shaklik et al. | ........... | 280/728.2 |
| 5,558,362 | A | * | 9/1996 | Acker et al. | ............. | 280/728.2 |
| 5,560,642 | A | * | 10/1996 | Davidson et al. | ......... | 280/728.2 |
| 5,577,763 | A | * | 11/1996 | Cuevas | .................. | 280/728.2 |
| 6,149,184 | A | * | 11/2000 | Ennis et al. | ............... | 280/728.2 |
| 6,325,407 | B1 | * | 12/2001 | Soderquist | ............... | 280/728.2 |
| 6,394,486 | B1 | * | 5/2002 | Fujimura et al. | ......... | 280/728.2 |
| 6,709,006 | B2 | | 3/2004 | Okamoto | | |
| 2003/0141705 | A1 | * | 7/2003 | Oka et al. | ................ | 280/728.2 |
| 2004/0100071 | A1 | * | 5/2004 | Chavez et al. | ............ | 280/728.2 |

FOREIGN PATENT DOCUMENTS

JP        2002-178868        6/2002

* cited by examiner

*Primary Examiner*—Lesley D. Morris
*Assistant Examiner*—George D. Spisich
(74) *Attorney, Agent, or Firm*—Foley & Lardner LLP

(57) ABSTRACT

The positioning of an airbag plate with respect to an inflator is achieved so as to prevent the generation of a rattle that may otherwise be caused by vibrations during vehicle travel. The bottom side of a column-shaped inflator that injects pressurized fluid is supported by a retainer. An opening edge of an airbag body is clamped between an airbag plate and the retainer when the airbag plate, which is located on the upper side of the inflator, is engaged with the retainer. The edge of the bottom opening of the airbag body is clamped between the airbag plate and the inflator. In one embodiment, shoulders, which are provided on the airbag plate, abut both ends of the inflator. In another embodiment, tongue strips, which are provided on the airbag plate, abut both ends of the inflator.

5 Claims, 9 Drawing Sheets

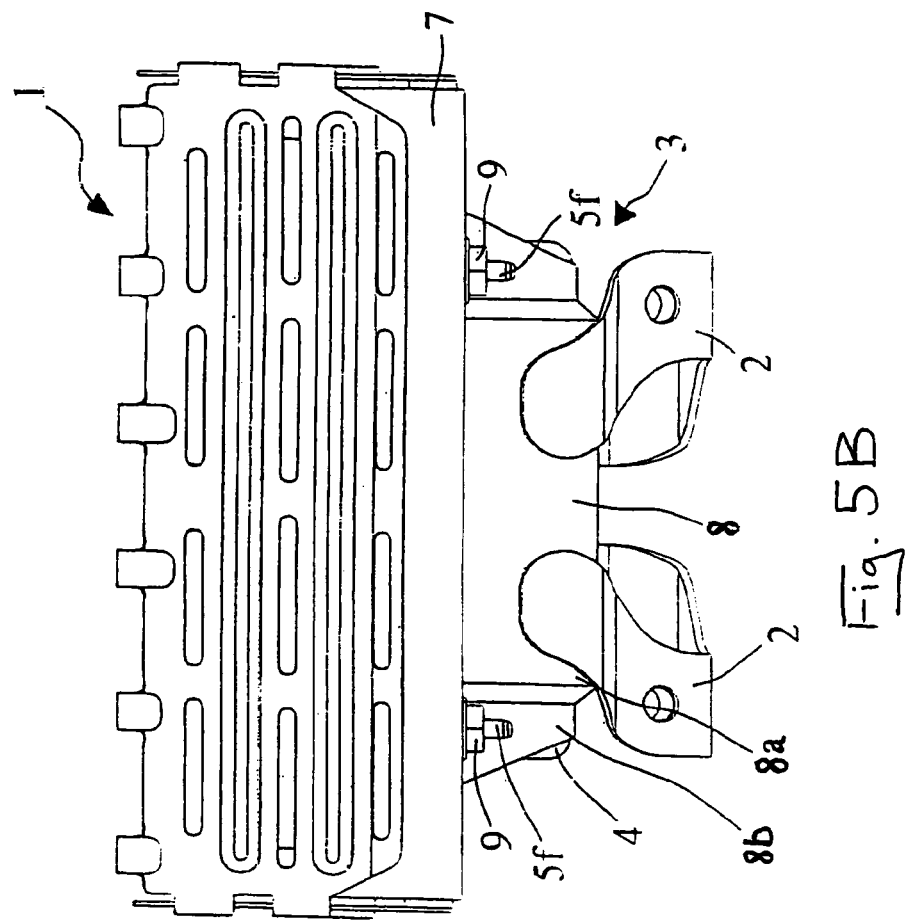
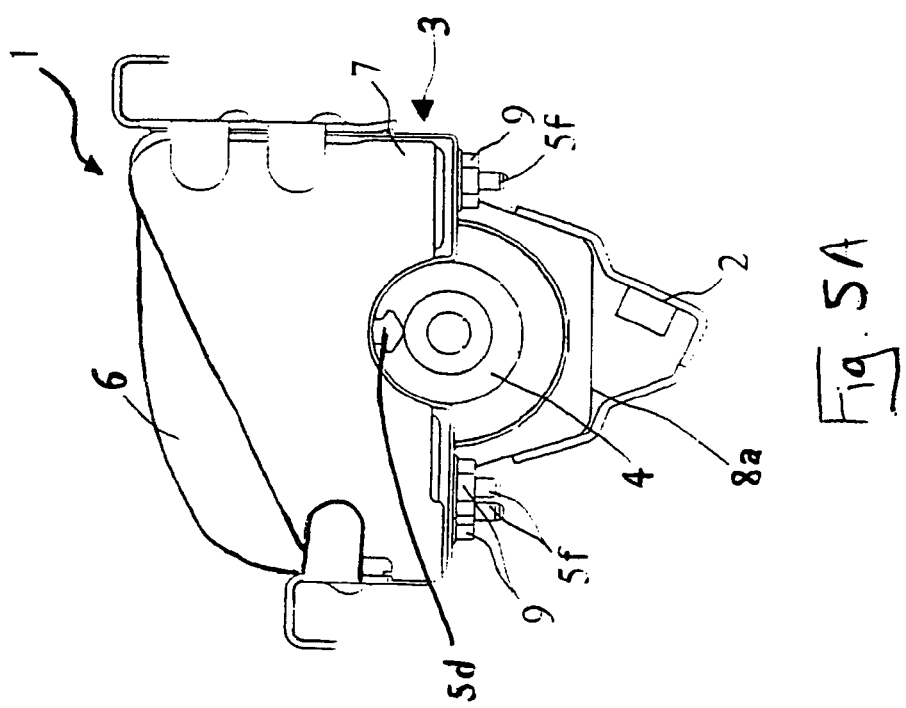

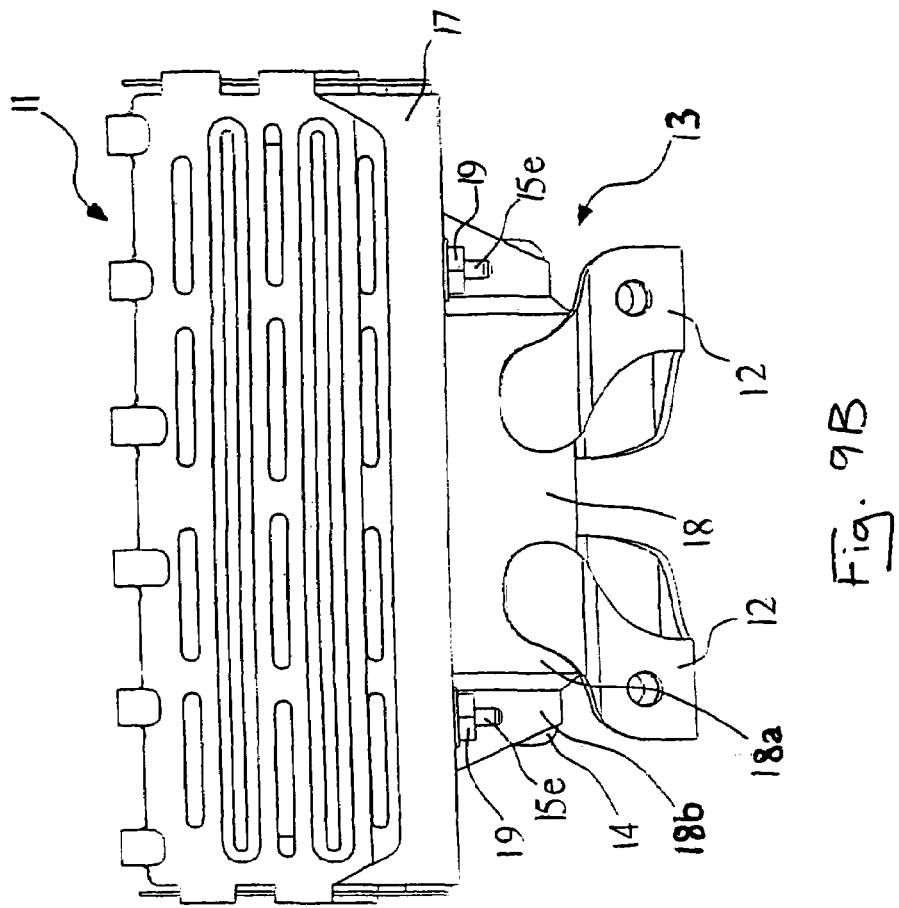
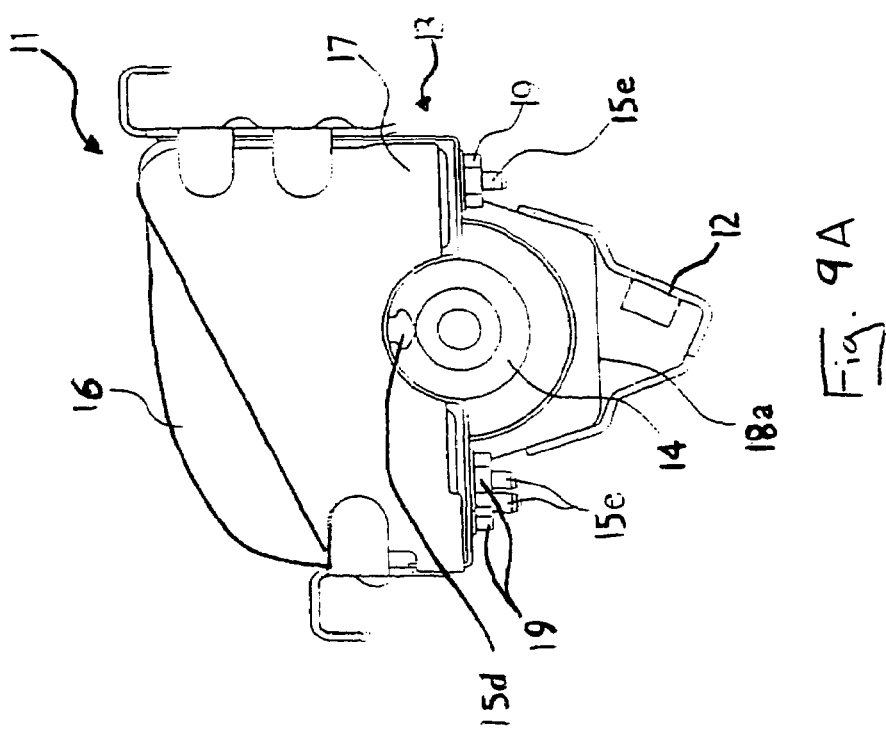

AIRBAG APPARATUS

BACKGROUND

The present invention relates to an airbag and, more specifically, to an airbag apparatus. A conventional airbag apparatus, which is disclosed in Japanese Unexamined Patent Application Publication No. 2002-178868, includes an inflator that inflates an airbag by injecting pressurized fluid into the airbag, upon detection of an impact associated with collision of a vehicle. Such an airbag apparatus includes: (a) a column-shaped inflator for injecting pressurized fluid; (b) a retainer for supporting the bottom side of the inflator; and (c) an airbag plate, which is located on the upper side of the inflator and which clamps an opening edge of the airbag body, when engaged with the retainer. One end of a bracket is fixed to the retainer whereas the other end of the bracket is fixed to a vehicle body, whereby the entire airbag apparatus is fixed to the vehicle body.

In the aforementioned airbag apparatus, although both ends of the bottom side of the inflator are supported by the retainer, both ends of the upper side of the inflator are unsupported. As a result, the positioning of the airbag plate with respect to the inflator in the thrust direction is unstable and, therefore, a rattle may be generated due to vibrations during vehicle travel.

Accordingly, the present invention has been made in light of the aforementioned problems. An object of the present invention is to provide an airbag apparatus in which the positioning of the airbag plate with respect to the inflator in the thrust direction is stable, so as to reduce or inhibit the generation of a rattle that may otherwise be caused by vibrations associated with vehicle travel.

SUMMARY

An embodiment of the invention addresses an airbag apparatus that includes, among other possible things: a retainer that is configured to support a bottom side of an inflator; and an airbag plate that is configured to be connected to the retainer. The inflator has two ends and is configured to inject pressurized fluid into an airbag body. The airbag plate is configured to be positioned on an upper side of the inflator. When the retainer and the airbag plate are connected, the airbag plate and the retainer are configured to clamp an edge of a bottom opening of the airbag body. The airbag plate is formed with shoulders that are configured to abut both ends of the inflator, to inhibit the formation of vibrations associated with the inflator.

In a further embodiment of this airbag apparatus, each of the shoulders may have a substantially tapered-shape.

In another further embodiment of this airbag apparatus, the shoulders may be integrally formed with the airbag plate.

In another further embodiment of this airbag apparatus, the apparatus may additionally include tongue strips that formed on the airbag plate. Moreover, each of the tongue strips may be shaped like an arrow tip. Additionally, each of the tongue strips may penetrate the airbag body proximate the bottom opening.

Another embodiment of the invention addresses an airbag apparatus that includes, among other possible things: a retainer that is configured to support a bottom side of an inflator; and an airbag plate that is configured to be connected to the retainer. The inflator has two ends and is configured to inject pressurized fluid into an airbag body. The airbag plate is configured to be positioned on an upper side of the inflator. When the retainer and the airbag plate are connected, the airbag plate and the retainer are configured to clamp an edge of a bottom opening of the airbag body. The airbag plate is formed with tongue strips that are configured to abut both ends of the inflator, to inhibit the formation of vibrations associated with the inflator.

In a further embodiment of this airbag apparatus, each of the tongue strips may be shaped like an arrow tip. Additionally, in a further embodiment of this airbag apparatus, each of the tongue strips may penetrate the airbag body proximate the bottom opening.

In a further embodiment of this airbag apparatus, the tongue strips may be integrally formed with the airbag plate.

In the aforementioned airbag apparatus embodiments, the positioning between the airbag plate and the inflator in the thrust direction can be achieved without providing an additional fixture by means of which the inflator could otherwise be stabilized.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 5A is a side view of the airbag apparatus of the embodiment shown in FIG. 1;

FIG. 5B is a front view of the airbag apparatus of the embodiment shown in FIG. 1;

FIG. 9A is a side view of the airbag apparatus of the embodiment shown in FIG. 6; and FIG. 9B is a front view of the airbag apparatus of the embodiment shown in FIG. 6.

DETAILED DESCRIPTION

Embodiments of the present invention will be described with reference to the drawings. Like numbers are used throughout the drawings to refer to the same or similar parts in each of the embodiments of the invention described herein. A first embodiment of the present invention will be described with respect to FIGS. 1-5B and a second embodiment of the present invention will be described with respect to FIGS. 6-9B.

Figure 1:
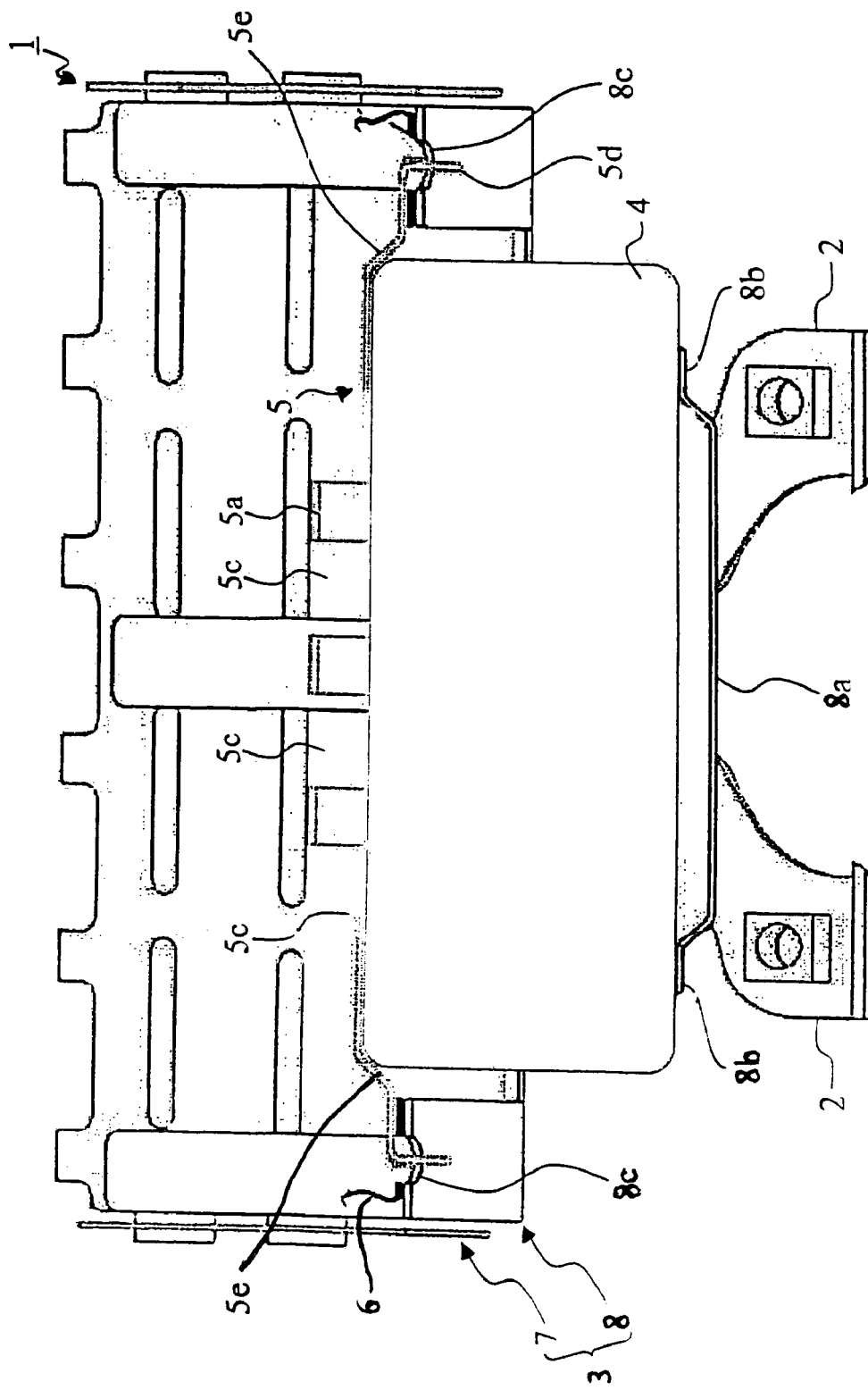
FIG. 1 is a cross-sectional view of a first embodiment of an airbag apparatus according to the present invention.
Figure 2:
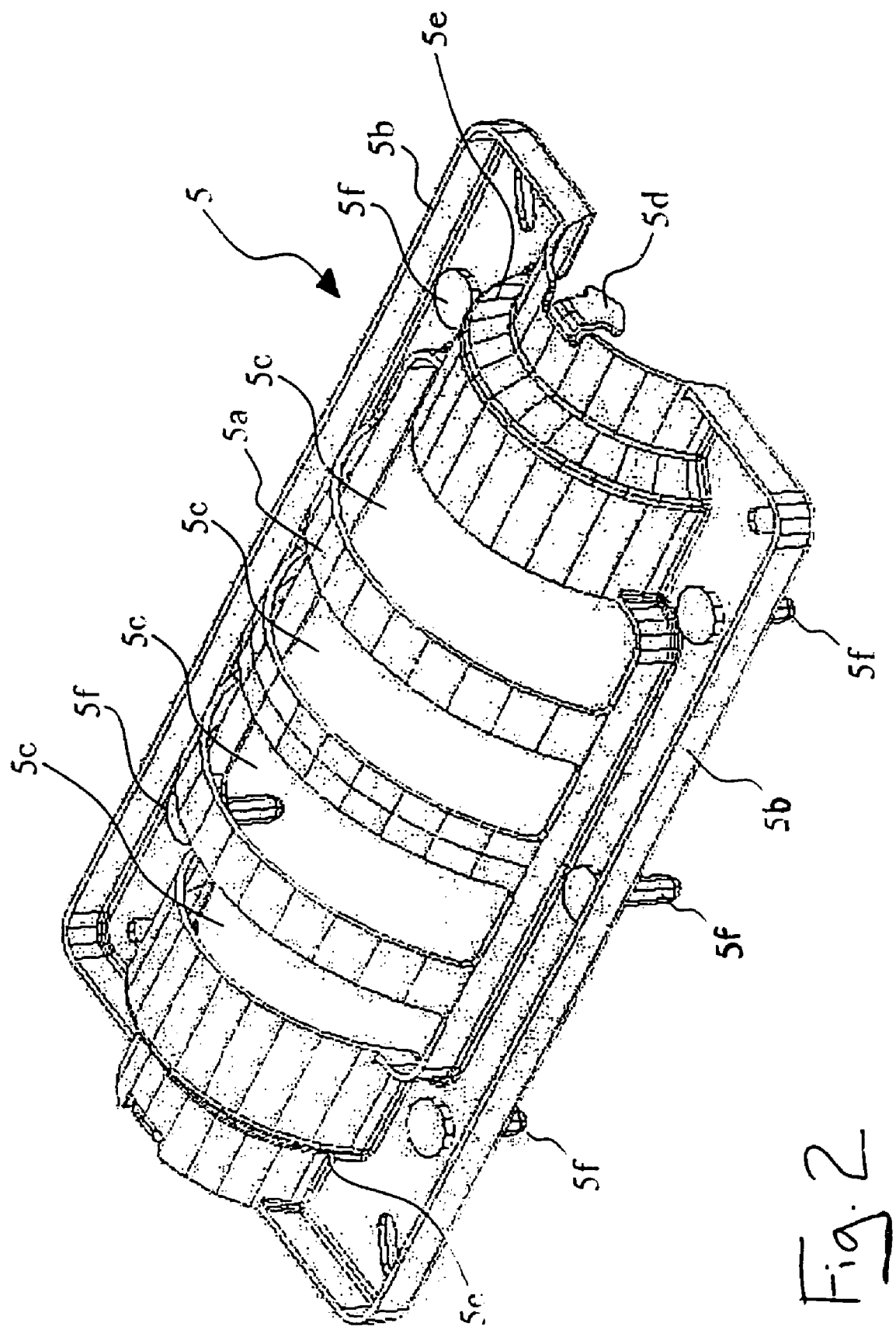
FIG. 2 is a perspective view of an airbag plate that is part of the airbag apparatus of the embodiment shown in FIG. 1.
Figure 3:
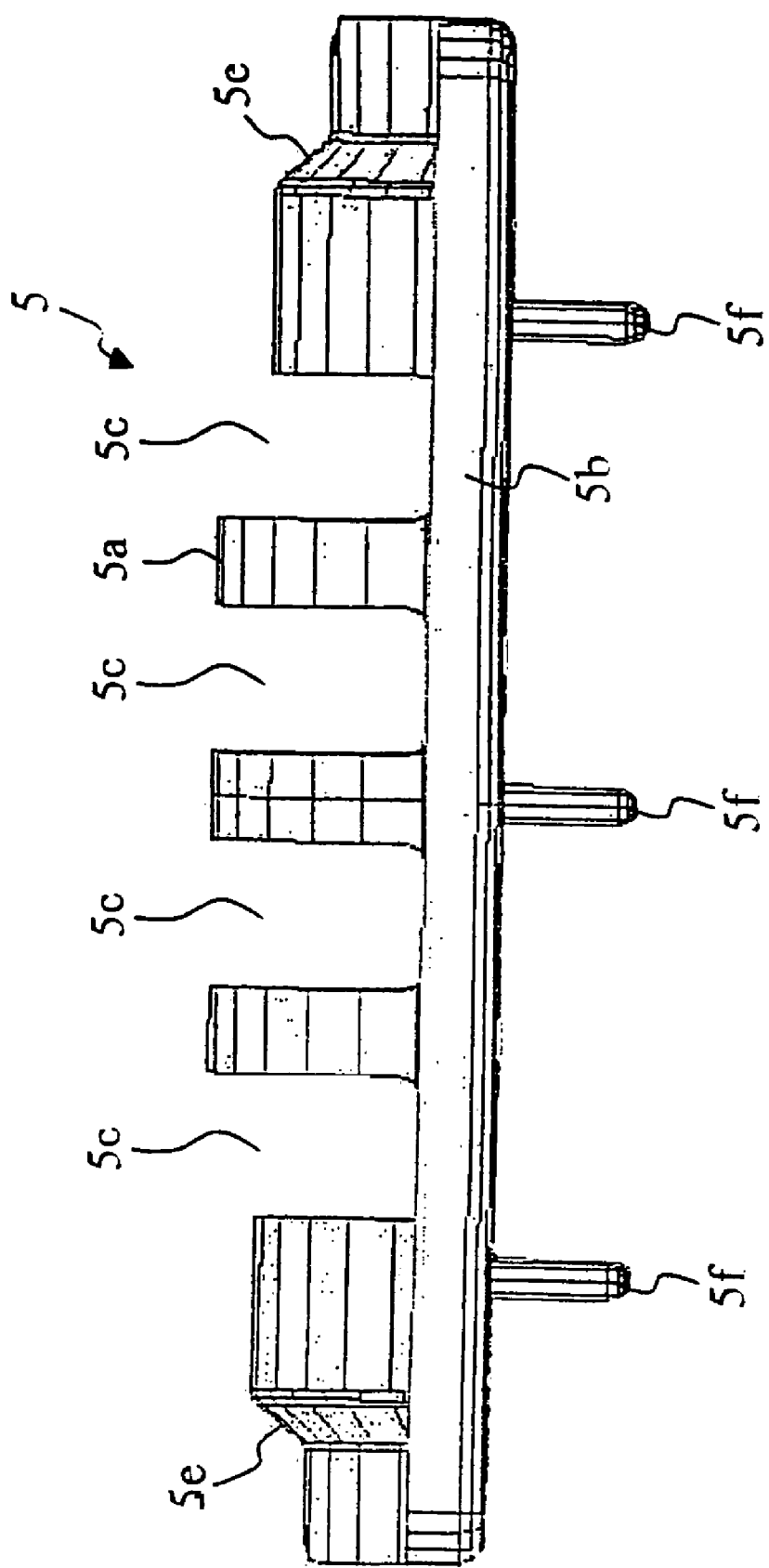
FIG. 3 is a side view of the airbag plate shown in FIG. 2.

The first airbag apparatus 1 embodiment is shown in FIG. 1. The airbag apparatus 1 includes: (a) a retainer 3 that has a plurality of fixing brackets 2 that are configured to engage a vehicle body (not shown); (b) an elongated or column-shaped inflator 4, a lower side of which is supported by the retainer 3; (c) an airbag plate 5 (shown best in FIGS. 2-3) that supports an upper side of the inflator 4; and (d) an airbag body 6, a bottom portion of which is clamped between the retainer 3 and the airbag plate 5.

Figure 4A:
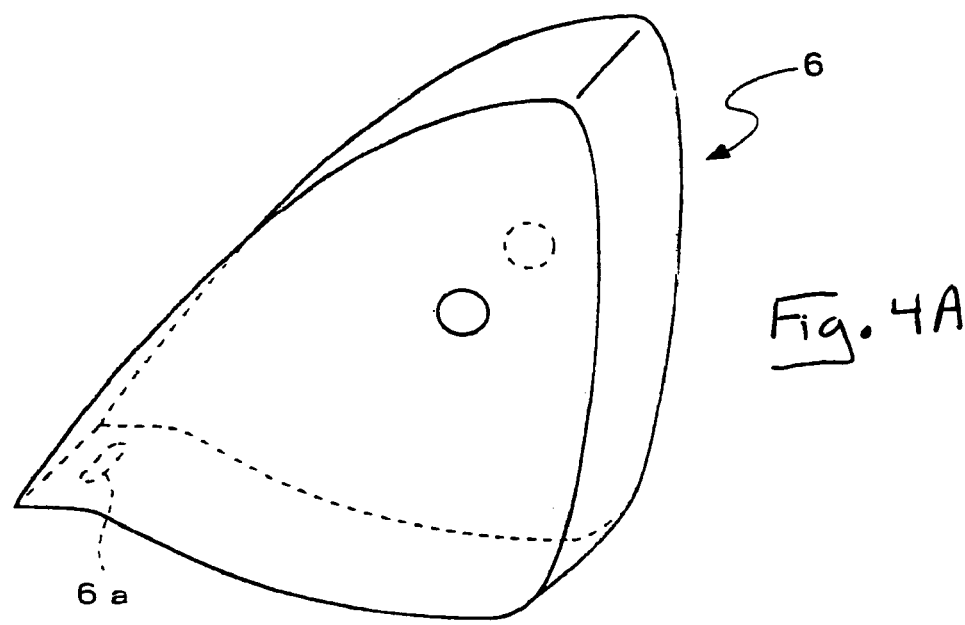
FIG. 4A is a perspective view of the airbag body of the embodiment shown in FIG. 1.
Figure 4B:
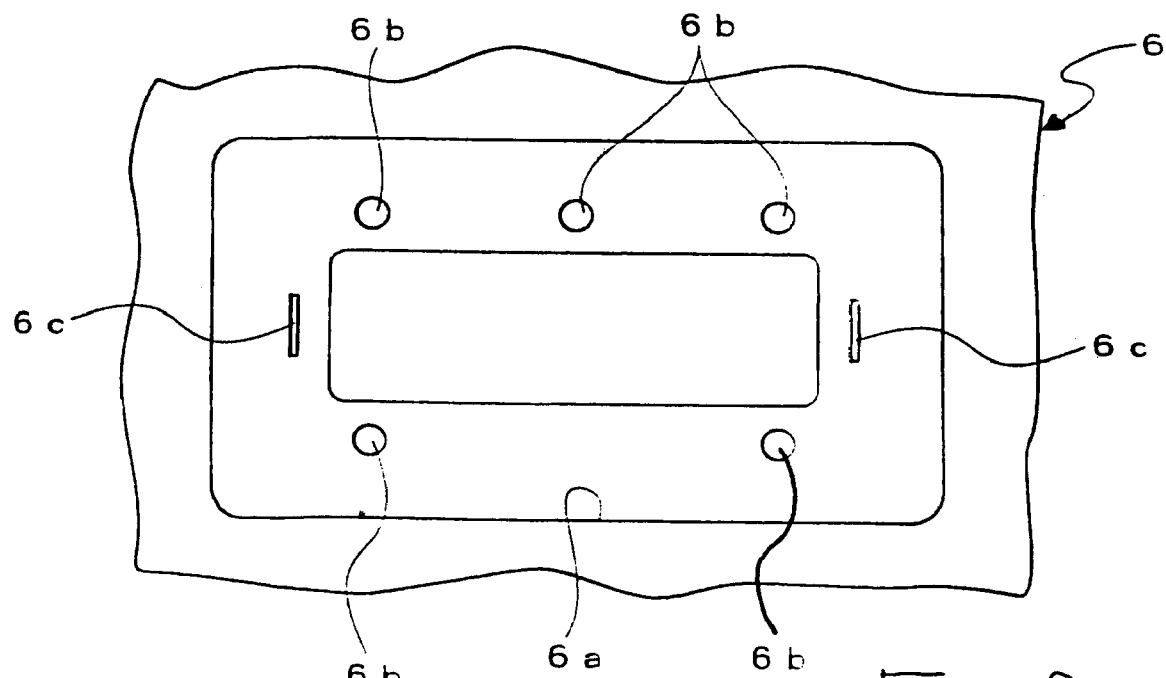
FIG. 4B is a bottom view of a portion of the airbag body shown in FIG. 4A.

When the inflator 4 is activated, the inflator 4 injects pressurized fluid into the airbag body 6 via a bottom opening 6a thereof, thereby causing the airbag body 6 to inflate into a deployed configuration that is shown in FIG. 4A. The bottom opening 6a is formed by two longitudinal edges and two widthwise edges, as shown in FIG. 4B. The bottom opening 6a is formed with, e.g., five bolt holes 6b that are positioned near the longitudinal edges thereof and with slits 6c that are positioned near the widthwise edges thereof.

As shown in FIG. 1, the retainer 3 includes a substantially box-shaped upper retainer 7 and a lower retainer 8 that is connected to the upper retainer 7. The airbag body 6 is folded and stored in the upper retainer 7; the folding and storage of the airbag body 6 is completed so that the airbag body 6 may be inflated and deployed in a predetermined manner. The lower retainer 8 is formed with a depression at the center portion thereof. The depression may be formed, e.g., by punching or the like so as to receive the bottom side of the inflator 4. A bottom center portion 8a of the lower retainer 8 is bent in a semi-hexagonal shape (in cross-section). The lower retainer 8 also includes two side portions 8b that are formed into a semi-circular shape. Upper sides of both ends of the lower retainer 8 are formed with elongated holes 8c at positions substantially corresponding to the both ends of the inflator 4.

The inflator 4 is a fluid (e.g., gas) generating device that is configured to inflate the airbag body 6, thereby causing the airbag body 6 to deploy. The inflator 4 itself may be of a conventional type. Moreover, the inflator 4 may be, e.g., of a compressed-gas type, a combustion-gas type, or other suitable inflator.

The airbag plate 5 serves to fix the airbag body 6 and the inflator 4 inside the retainer 3. As is most clearly shown in FIG. 2, the airbag plate 5 includes: (a) an arched portion 5a that is formed into a semi-circular arch shape; and (b) a flange portion 5b that is formed at both longitudinal edges of the arched portion 5a.

A plurality (e.g., four) of openings 5c (which may, as shown, be generally square in shape), which are configured to allow gas from the inflator 4 to pass therethrough, are formed at the center of the arched portion 5a. Tongue strips 5d, which may be shaped like arrow tips, extend from the left and right outer edges of the arched portion 5a. The tongue strips 5d are configured to penetrate through the slits 6c of the bottom opening of the airbag body 6.

Shoulders 5e are formed between the arched portion 5a and the tongue strips 5d. As shown, the shoulders 5e may have a tapered-shape that upwardly increases in width. Moreover, in some embodiments, the airbag plate 5 and the shoulders 5e may be integrally formed. In the assembled state, the shoulders 5e are configured to abut both ends of the inflator 4, which is positioned therebetween.

The flange portion 5b is provided with a plurality (e.g., five) bolts 5f. The bolts 5f are journalled through the bolt holes 6b of the airbag body 6 and through holes (not shown) provided on the lower retainer 8. As a result, the bolts 5f, in conjunction with nuts 9, enable the airbag plate 5 to be fixed to the lower retainer 8.

The airbag apparatus or module 1 according to the first embodiment may be assembled in the manner hereafter described. First, the airbag body 6 is connected to the airbag plate 5 by passing (i) the tongue strips 5d through the slits 6c from the inner side of the airbag body 6 and (ii) the bolts 5f through the through bolt holes 6b. As a result, the arched portion 5a of the airbag plate 5 will be provided in the bottom opening 6a of the airbag body 6. Moreover, by providing an odd number of bolts 5f (e.g., five in the shown embodiment) that are not uniformly spaced, an erroneous assembly of the airbag plate 5 and the airbag body 6 may be prevented (or at least greatly inhibited).

Second, the airbag plate 5 (and the airbag body 6 that is affixed thereto) is disposed inside the upper retainer 7, while the inflator 4 is supported by the lower retainer 8. The tongue strips 5d are then pushed through the elongated holes 8c and the bolts 5f are pushed through the through holes of the lower retainer 8, respectively. As a result, (a) a peripheral edge of the bottom opening 6a of the airbag body 6 is clamped between the airbag plate 5 and the lower retainer 8 and (b) both ends of the inflator 4 are positioned between the shoulders 5e of the airbag plate 5.

Third, by tightening the nuts 9 completely onto the bolts 5f, (a) the airbag body 6 is completely clamped to the airbag plate 5 and the lower retainer 8, and (b) the inflator 4 is clamped between the lower retainer 8 and the airbag plate 5 (and the shoulders 5e thereof).

The airbag apparatus 1 may then be fixed in a vehicle body by means of the brackets 2. For example, when it is used as a passenger airbag module (for protecting, e.g., a passenger's head, upper body, lower legs, etc.), the airbag apparatus 1 may be fixed in the vehicle's instrument panel.

In the airbag apparatus 1 embodiment previously described, the airbag body 6 may typically be folded and stored in the upper retainer 7. When the vehicle is involved in a collision, a sensor (not shown) may detect this collision and send an ignition signal to the inflator 4. In response to the ignition signal, the inflator 4 may inject pressurized fluid into the airbag body 6 via the openings 5c of the airbag plate 5 and the bottom opening 6a of the airbag body 6.

Figure 6:
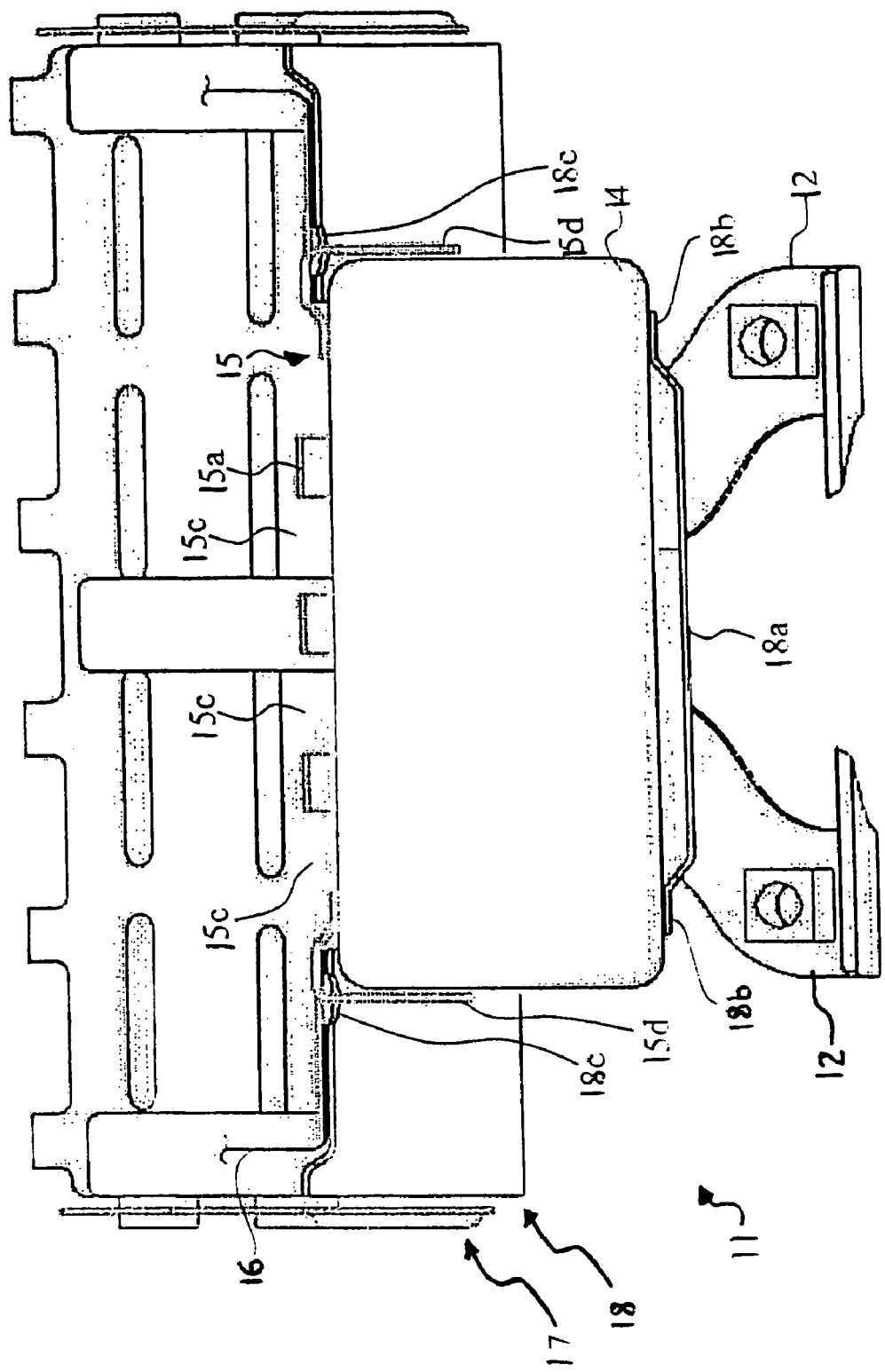
FIG. 6 is a cross-sectional view of a second embodiment of an airbag apparatus according to the present invention.
Figure 7:
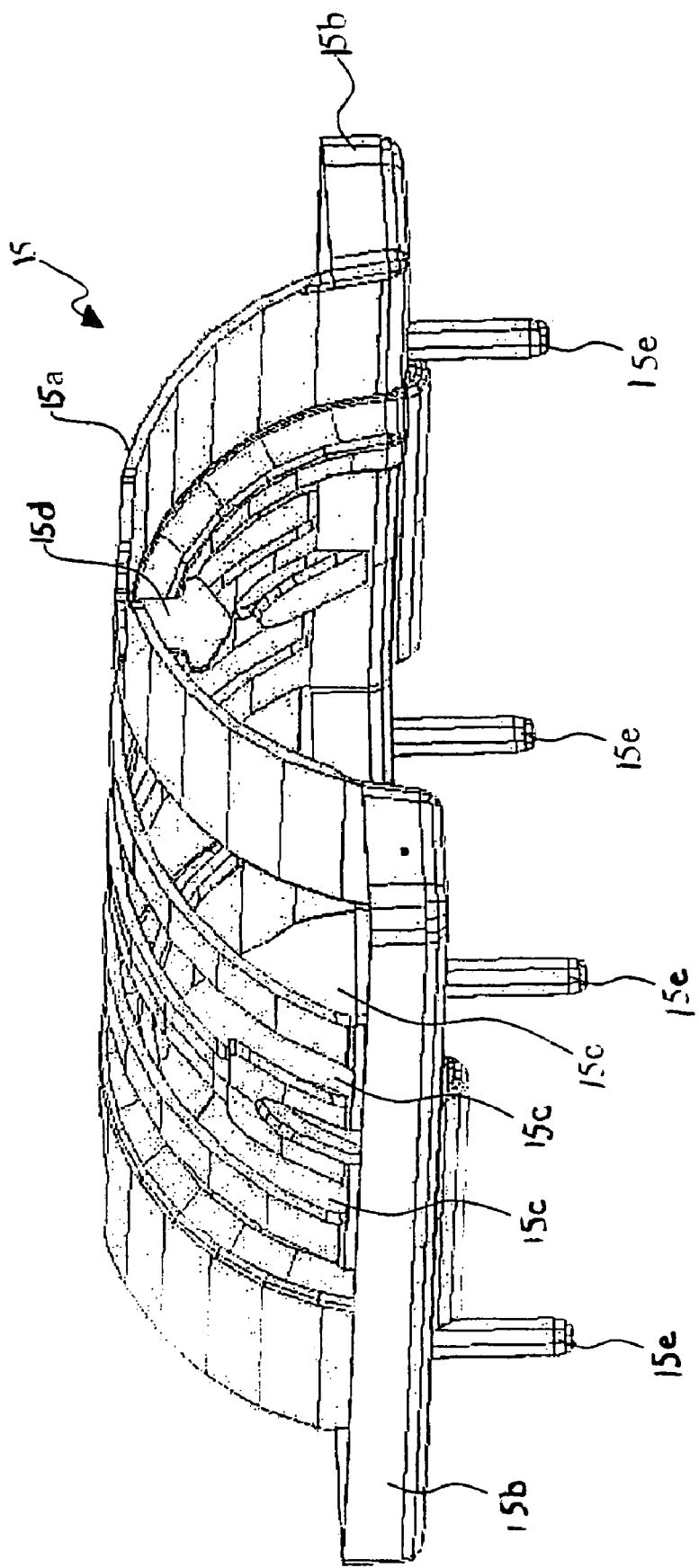
FIG. 7 is a perspective view of an airbag plate that is part of the airbag apparatus of the embodiment shown in FIG. 6.

The second airbag apparatus 11 embodiment is shown in FIG. 6. The airbag apparatus 11 includes: (a) a retainer 13 that has a plurality of fixing brackets 12 that are configured to engage a vehicle body (not shown); (b) a column-shaped inflator 14, a lower side of which is supported by the retainer 13; (c) an airbag plate 15 (shown best in FIG. 7) that supports an upper side of the inflator 14; and (d) an airbag body 16, a bottom portion of which is clamped between the retainer 13 and the airbag plate 15.

Figure 8A:
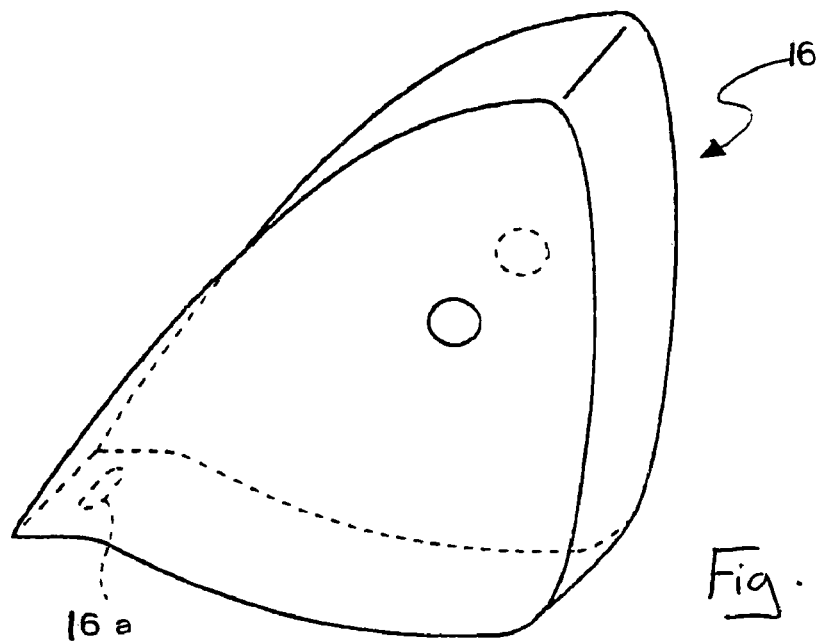
FIG. 8A is a perspective view of an airbag body of the embodiment shown in FIG. 6.
Figure 8B:
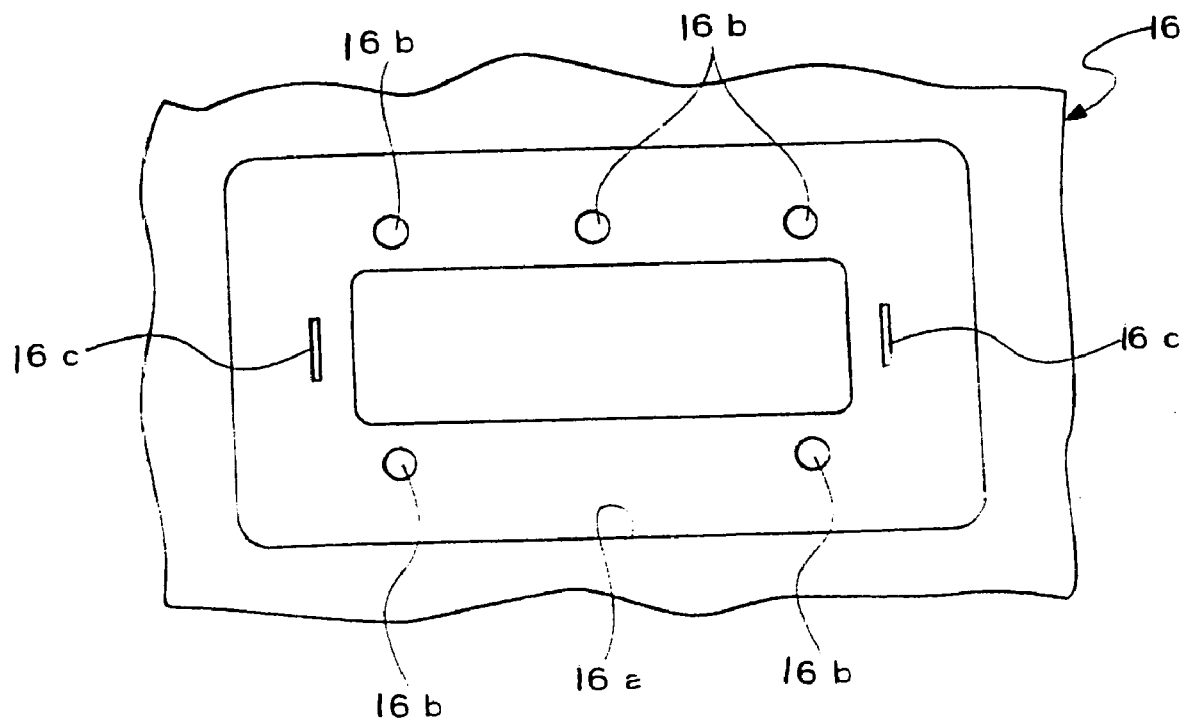
FIG. 8B is a bottom view of a portion of the airbag body shown in FIG. 8A.

When the inflator 14 is activated, the inflator 14 injects pressurized fluid into the airbag body 16 via a bottom opening 16a thereof, thereby causing the airbag body 16 to inflate into a deployed configuration that is shown in FIG. 8A. The bottom opening 16a is formed by two longitudinal edges and two widthwise edges, as shown in FIG. 8B. The bottom opening 16a is formed with, e.g., five bolt holes 16b that are positioned near the longitudinal edges thereof and with slits 16c that are positioned near the widthwise edges thereof.

As shown in FIG. 6, the retainer 13 includes a substantially box-shaped upper retainer 17 and a lower retainer 18 that is connected to the upper retainer 17. The airbag body 16 is folded and stored in the upper retainer 17; the folding and storage of the airbag body 16 is completed so that the airbag body 16 may be inflated and deployed in a predetermined manner. The lower retainer 18 is formed with a depression at a center portion thereof. The depression may be formed, e.g., by punching or the like so as to receive the bottom side of the inflator 14. A bottom center portion 18a of the lower retainer 18 is bent in the semi-hexagonal shape (in cross-section). The lower retainer 18 also includes two side portions 18b that are formed into a semi-circular shape. Upper sides of both ends of the lower retainer 18 are formed with elongated holes 18c at positions substantially corresponding to the both ends of the inflator 14.

The inflator 14 is a fluid (e.g., gas) generating device that is configured to inflate the airbag body 16, thereby causing the airbag body 16 to deploy. The inflator 14 itself may be of a conventional type. Moreover, the inflator 14 may be, e.g., of a compressed-gas type, a combustion-gas type, or other suitable inflator.

The airbag plate 15 serves to fix the airbag body 16 and the inflator 14 inside the retainer 13. As is most clearly shown in FIG. 7, the airbag plate 15 includes: (a) an arched portion 15a that is formed into a semi-circular arch shape; and (b) a flange portion 15b that is formed at both longitudinal edges of the arched portion 15a.

A plurality (e.g., four) openings 15c (which may, as shown, be generally square in shape), which are configured to allow gas from the inflator 14 to pass therethrough, are formed at the center of the arched portion 15a. Tongue strips 15d, which may be shaped like arrow tips, extend from the left and right outer edges of the arched portion 15a. Moreover, in some embodiments, the airbag plate 15 and the tongue strips 15d may be integrally formed. The tongue strips 15d are configured to penetrate through the slits 16c of the bottom opening 16a of the airbag body 16. In the assembled state, which is later discussed in detail, the tongue strips 11d are configured to abut and, therefore, retain both ends of the inflator 14.

The flange portion 15b is provided with a plurality (e.g., five) bolts 15e. The bolts 15e are journalled through the bolt holes 16b of the airbag body 16 and through holes (not shown) provided on the lower retainer 18. As a result, the bolts 15e, in conjunction with nuts 19, enable the airbag plate 15 to be fixed to the lower retainer 18.

The airbag apparatus 11 according to the second embodiment may be assembled in the manner hereafter described. First, the airbag body 16 is connected to the airbag plate 15 by passing (i) the tongue strips 15d through the slits 16c from the inner side of the airbag 16 and (ii) the bolts 15e through the through bolt holes 16b. As a result, the arched portion 15a of the airbag plate 15 will be provided in the bottom opening 16a of the airbag body 16. Moreover, by providing an odd number of bolts 15e (e.g., five in the shown embodiment) that are not uniformly spaced, an erroneous assembly of the airbag plate 15 and the airbag body 16 may be prevented (or at least greatly inhibited).

Second, the airbag plate 15 (and the airbag body 16 that is affixed thereto) is disposed inside the upper retainer 17, while the inflator 14 is supported by the lower retainer 18. The tongue strips 15d are then pushed through the elongated holes 18c and the bolts 15e are pushed through the through holes of the lower retainer 18, respectively. As a result, (a) a peripheral edge of the bottom opening 16a of the airbag body 16 is clamped between the airbag plate 15 and the lower retainer 18 and (b) both ends of the inflator 14 are positioned between the tongue strips 15d.

Third, by tightening the nuts 19 completely onto the bolts 15e, the airbag body 16 is completely clamped to the airbag plate 15 and the lower retainer 18, and (b) the inflator 14 is clamped between the lower retainer 18 and the airbag plate 15 (and the tongue strips 15d thereof).

The airbag apparatus 11 may then be fixed in a vehicle body by means of the brackets 12. For example, when it is used as a passenger airbag apparatus (for protecting, e.g., a passenger's head, upper body, lower legs, etc.), the airbag apparatus 11 may be fixed in the vehicle's instrument panel.

In the airbag apparatus 11 embodiment previously described, the airbag body 16 may typically be folded and stored in the upper retainer 17. When the vehicle is involved in a collision, a sensor (not shown) may detect this collision and send an ignition signal to the inflator 14. In response to the ignition signal, the inflator 14 may inject pressurized fluid into the airbag body 16 via the openings 15c of the airbag plate 15 and the bottom opening 16a of the airbag body 16.

The priority applications, Japanese Application No. 2004-224131 and Japanese Application No. 2004-224132 (both of which were filed on Jul. 30, 2004) are incorporated herein by reference in their entireties.

Given the disclosure of the present invention, one versed in the art would appreciate that there may be other embodiments and modifications within the scope and spirit of the invention. Accordingly, all modifications attainable by one versed in the art from the present disclosure that are within the scope and spirit of the present invention are to be included as further embodiments of the present invention. The scope of the present invention is to be defined as set forth in the following claims.

What is claimed is:

1. An airbag apparatus comprising:
   a retainer that is configured to support a bottom side of an elongated inflator; and
   an airbag plate that is configured to be connected to the retainer,
   wherein the inflator has two ends and is configured to inject pressurized fluid into an airbag body,
   wherein the airbag plate is configured to be positioned on an upper side of the inflator,
   wherein, when the retainer and the airbag plate are connected, the airbag plate and the retainer are configured to clamp an edge of a bottom opening of the airbag body,
   wherein the airbag plate is formed with tongue strips that are configured to abut both ends of the inflator, to inhibit formation of vibrations associated with the inflator,
   wherein each of the tongue strips has an arrow tip shape, and
   wherein each of the tongue strips penetrates the airbag body proximate the bottom opening.

2. The airbag apparatus according to claim 1, wherein the tongue strips are integrally formed with the airbag plate.

3. The airbag apparatus according to claim 1, wherein each end of the airbag plate has a substantially tapered-shape.

4. An airbag module comprising:
   an airbag comprising an airbag body;
   an elongated inflator having two ends and being supported on a bottom side by a retainer; and
   an airbag plate;
   wherein the airbag is clamped between the airbag plate and the retainer;
   wherein the airbag plate includes tongue shaped strips that are positioned to abut both ends of the inflator to thereby inhibit relative movement between the inflator and the airbag plate,
   wherein each of the tongue strips has an arrow tip shape, and
   wherein each of the tongue strips penetrates the airbag body proximate a bottom opening of the airbag body.

5. The airbag module of claim 4, wherein each end of the airbag plate has a substantially tapered shape.

* * * * *